(12) United States Patent
Lassen et al.

(10) Patent No.: US 12,405,152 B2
(45) Date of Patent: Sep. 2, 2025

(54) WEIGHT DETERMINATION OF AN ANIMAL BASED ON 3D IMAGING

(71) Applicant: Viking Genetics FMBA, Randers (DK)

(72) Inventors: Jan Lassen, Randers (DK); Søren Borchersen, Horsens (DK)

(73) Assignee: Viking Genetics FMBA, Randers (DK)

( * ) Notice: Subject to any disclaimer, the term of this patent is extended or adjusted under 35 U.S.C. 154(b) by 438 days.

(21) Appl. No.: 17/617,445

(22) PCT Filed: Jun. 26, 2020

(86) PCT No.: PCT/EP2020/068095
§ 371 (c)(1),
(2) Date: Dec. 8, 2021

(87) PCT Pub. No.: WO2020/260631
PCT Pub. Date: Dec. 30, 2020

(65) Prior Publication Data
US 2022/0221325 A1 Jul. 14, 2022

(30) Foreign Application Priority Data
Jun. 26, 2019 (EP) .................................... 19182740

(51) Int. Cl.
*G01G 17/08* (2006.01)
*A01K 29/00* (2006.01)
(Continued)

(52) U.S. Cl.
CPC ............. *G01G 17/08* (2013.01); *A01K 29/00* (2013.01); *G06V 10/44* (2022.01); *G06V 40/10* (2022.01)

(58) Field of Classification Search
CPC ........ G06V 10/44; G06V 40/10; G01G 17/08; A01K 29/00
See application file for complete search history.

(56) References Cited

U.S. PATENT DOCUMENTS

| | | |
|---|---|---|
| 7,399,220 B2 | 7/2008 | Kriesel et al. |
| 8,474,412 B1 | 7/2013 | Walden et al. |
| (Continued) | | |

FOREIGN PATENT DOCUMENTS

| | | |
|---|---|---|
| CA | 2498948 A1 | 8/2006 |
| CA | 2778339 A1 | 5/2010 |
| (Continued) | | |

OTHER PUBLICATIONS

Machine translation of WO 2014026765 (Year: 2014).*
(Continued)

*Primary Examiner* — Natalie Huls
(74) *Attorney, Agent, or Firm* — Dinsmore & Shohl LLP (57) ABSTRACT

The present disclosure relates to determination of the weight of an animal, especially cattle, in a shed environment based on vision technology, in particular 3D imaging. A first embodiment relates to a method for determining the weight of an animal with known breed, the method comprising the steps of acquiring at least one 3D image of the back of the animal, extracting data from said at least one 3D image relating to the topology of the back of the animal, and calculating the weight of said animal by correlating the extracted data against a reference model comprising information of the topology of the back versus the weight for the breed of said animal.

21 Claims, 8 Drawing Sheets

(51) Int. Cl.
*G06V 10/44* (2022.01)
*G06V 40/10* (2022.01)

(56) References Cited

U.S. PATENT DOCUMENTS

| | | | |
|---|---|---|---|
| 8,787,621 B2 | 7/2014 | Spicola, Sr. et al. | |
| 11,393,088 B2* | 7/2022 | Psota | G06V 40/103 |
| 2005/0257748 A1 | 11/2005 | Kriesel et al. | |
| 2010/0222684 A1 | 9/2010 | Hatzilias et al. | |
| 2010/0275659 A1 | 11/2010 | Son et al. | |
| 2012/0299731 A1 | 11/2012 | Triener | |
| 2014/0270480 A1 | 9/2014 | Boardman et al. | |
| 2016/0012278 A1* | 1/2016 | Banhazi | G06V 10/44 382/110 |
| 2018/0042584 A1 | 2/2018 | Biondi | |
| 2020/0143157 A1* | 5/2020 | Borchersen | G06V 10/46 |
| 2020/0225076 A1* | 7/2020 | Fournier | G01G 17/08 |
| 2021/0004577 A1* | 1/2021 | Amat Roldan | A01K 29/00 |
| 2021/0045361 A1* | 2/2021 | Dumm | G01G 23/00 |
| 2021/0153479 A1* | 5/2021 | Mindel | G06V 10/22 |
| 2021/0161105 A1* | 6/2021 | Won | A01K 5/02 |
| 2023/0281265 A1* | 9/2023 | Xiao | G06F 17/10 703/2 |
| 2023/0354781 A1* | 11/2023 | Ii | G06T 7/155 |

FOREIGN PATENT DOCUMENTS

| | | | | |
|---|---|---|---|---|
| CA | 3084664 A1 | 5/2019 | | |
| CA | 2989258 | 10/2023 | | |
| CN | 103884280 A1 | 6/2014 | | |
| CN | 105784083 A | 7/2016 | | |
| CN | 107820616 A | 3/2018 | | |
| CN | 109329097 A | 2/2019 | | |
| CN | 109632059 A | * | 4/2019 | A01K 29/005 |
| CN | 109635703 A | * | 4/2019 | |
| DE | 10050836 A1 | 6/2002 | | |
| DK | 495080 A | 5/1981 | | |
| EP | 29562 B1 | 2/1986 | | |
| EP | 0224253 A2 | 6/1987 | | |
| GB | 2546572 A | 7/2019 | | |
| JP | 2007175050 A | 7/2007 | | |
| JP | 2019004782 A | 1/2019 | | |
| WO | 2006136973 A2 | 12/2006 | | |
| WO | 2010127023 A1 | 11/2010 | | |
| WO | 2010127277 A2 | 11/2010 | | |
| WO | 2011143711 A1 | 11/2011 | | |
| WO | 2013174671 A1 | 11/2013 | | |
| WO | 2014026765 A1 | 2/2014 | | |
| WO | 2015156833 A1 | 10/2015 | | |
| WO | 2016192853 A1 | 12/2016 | | |
| WO | 2017001538 A1 | 1/2017 | | |
| WO | 2018094165 A1 | 5/2018 | | |
| WO | 2019003015 A1 | 1/2019 | | |
| WO | 2019/090310 A1 | 5/2019 | | |

OTHER PUBLICATIONS

Nir et al., "3D Computer-vision system for automatically estimating heifer height and body mass", Biosystems Engineering (2017), https://doi.org/10.1016/j.biosystemseng.2017.11.014.

Song BW et al., "Automated body weight prediction of dairy cows using 3-dimensional vision", Journal of Dairy Science vol. 101 No. 5, 2018, p. 1-12.

* cited by examiner

WEIGHT DETERMINATION OF AN ANIMAL BASED ON 3D IMAGING

CROSS-REFERENCE TO RELATED APPLICATIONS

This application is a U.S. National Phase of PCT/EP2020/068095, entitled "Weight determination of an animal based on 3D imaging" and filed Jun. 26, 2020, which claims priority to European Patent Application No. 19182740.1, entitled "Weight determination of an animal based on 3D imaging" and filed Jun. 26, 2019, each of which is incorporated herein by reference in its respective entirety.

The present disclosure relates to determination of the weight of an animal, especially cattle, in a shed environment based on vision technology, in particular 3D imaging.

BACKGROUND OF THE INVENTION

When running a large agriculture with a large number of individual animals it is a challenge to constantly be aware of each and every animals well-being. The wellbeing of the animal is very important, both from the humane perspective of the farmer having the responsibility for the well-being of these animals, but also since the healthy, well-fed animals ensures a greater productivity and is of greater value to the farmer. The well-being of the animal is highly correlated with the weight of the animal, especially the weight stability of a grown animal and the weight gain of an animal still growing. Hence, it is of great interest to frequently monitor the weight of an animal.

The process of weighing a farm animal is typically provided by physically placing an animal on a weight scale, and either manually or digitally noting the weight of that particular animal. This is often a laborious and long process as modern farms has a large number of animals, which means that each would have to be individually brought up on a weight scale, one by one, to log the individual weight of each animal. Furthermore, the animal will have to be identified in the process in order to ascribe the correct weight to the correct animal. This identification may for instance happen by the use of the identification tags on the animal, prolonging the process even further. Furthermore, if the animals are living in a shed or a field in which they are free to move around independently it is even more difficult to keep track of which animals has been weighed and which has not. Due to the complication of the process of weighing the animal, weighing is not in widespread use and the amount of data available when evaluating the weight development of each animal is limited or even absent.

WO 2014/026765 discloses an approach based on mobile 3D cameras for determining parameters about a livestock such as weight, portion weight or lean meat proportion. In the method a 3D image of the livestock is recorded to produce a 3D model which is analysed on the basis of previously determined reference values, in order to output and/or store the information obtained from the analysed livestock.

WO 2010/127023 describes a contactless system and method for estimating the volume, mass or weight of an animal. Preferably, the animal is imaged with a stereoscopic camera, and a 3D representation of the target animal is derived from the stereoscopic images. A software module is provided to reshape the virtual model, using a set of independently configurable shape variables, to approximately fit the spatial representation of the individual animal. Mass or weight of the animal is estimated as a function of shape variables characterizing the reshaped virtual model.

WO 2015/156833 describes a method for estimating bodyweight by images of the animal. The system uses markers to characterize the weight, health, and other parameters of the animal. The system is configured to log these parameters in a temporal database.

Nir et al. (Biosystem engineering, 173, p. 4-10 (2018)) describes a method for determining the weight of a cow from imaging data, and estimate the shape of the animal by an ellipse to calculate an approximatively weight of said animal.

The challenges in using 3D images in weight determination is often to have each animal singled out and immobilize it at the 3D imaging facility. Often this is done by placing the animal in a small stall in which the sidewalls or railing are confining the animal so that, basically, it is unable to move. In this case, the use of 3D imaging does not eliminate the need to have to handle each individual animal, as the animal will have to be individually shut in the small confined space and the process hence remains lengthy and laborious and somewhat manual. Furthermore, the setups are often complex and expensive making the weight determination a costly affair.

The weight, and especially the development of weight, of an animal is furthermore an important measure for the physical wellbeing of the animal in general. Hence, this is also an important parameter when evaluating the animal's body condition score. The wellbeing of the animal is furthermore important for having productive animals in the sense that a well-fed animal can get pregnant from a young age and will produce a larger amount of milk and meat.

SUMMARY OF THE INVENTION

The purpose of the present disclosure is to provide a system and method for automatic or semiautomatic determination of the weight of an animal based on imaging of the animal, preferably exclusively based on imaging of the animal and preferably 3D imaging from above the animal.

One aspect of the present disclosure relates to a method a method for determining the weight of an animal, preferably an animal with known breed, the method comprising the step of acquiring at least one image, preferably 3D image, of the animal, preferably of the back of the animal. It has previously been shown that the back of the animal carries a lot of information of the specific animal. The method may further comprise the step of extracting data from said at least one image, preferably data relating to the topology and/or topography of the back of the animal. Advantageously the weight of the animal can be calculated by correlating the extracted data against a reference model comprising information of the topology of the back versus the weight for the breed of said animal.

The present inventors have realized that the weight of an animal correlates exclusively with the 3D shape, i.e. topology and/or topography, of the back of the animal. I.e. parameters such as age of the animal, lactation, anatomy, etc., can be left out of the estimation. This makes it possible to estimate the weight of an animal based on 3D images alone acquired from above such that the topology of the back of the animal can be extracted from the 3D image. This makes it also possible to install the presently disclosed system in stable, cowshed, pigsty, or the like and acquire images of the animals from above, for example while the animals are eating or while they pass through a lock, for example on their way to on returning from milking. In the presently disclosed approach it has been shown that all it requires is a reference model for the specific breed of the animal, a reference model that correlates topology of the back of the animal with the weight of the animal. It has also been shown that only a very limited number of topology predictors extracted from the acquired 3D image is enough to accurately determine the weight of the animal. This eliminates the need for singling out each animal and manually place it on a weight scale or in a confined stall in order to gain information about its weight. This further allows for the continuous monitoring of the animals body weight on a day-to-day basis and even multiple times every day.

In particular the inventors have realized that contour points extracted from 3D image data of the back of the animal correlates very good with the weight of the animal, in particular cattle. Hence, data can advantageously be extracted in the form of a discrete number of contour points from said at least one 3D image. The contour points can for example be extracted relative to a line of local maxima along the back of the animal, typically defined as the spine of the animal defining a longitudinal direction in the 3D image of the animal. Experiments have shown that less than 20 contour points is adequate to accurately predict the weight of the animal, typically given a reference model that is also based on contour points. Hence, only contour points, extracted from 3D imaging of the back of the animal, correlates directly with the weight of the animal. I.e. there is no need for complicated 3D point cloud models or inclusion of animal specific parameters.

The present disclosure further relates to a system for determining the weight of an animal with known breed, comprising an imaging system configured to acquire at least one 3D image of the back of an animal, and a processing unit configured for executing the presently disclosed methods.

The presently disclosed system and method for weight determination can completely eliminate the need for individually handling each animal in the process of determining their weight which enables the possibility of frequent monitoring of each individual animal in a large herd. For example the animal may be walking through a lock/narrow aisle connecting a shed resting area with a feeding and/or milking area. The aisle may be so narrow that it only allow passages of one animal at the time. One or more images of the back of the animal may then be acquired by one or more cameras placed above the aisle. The camera(s) may be of any type of camera providing 3D information, such as, but not limited to, a time of flight (ToF) camera, stereo camera, structured light camera, light-field camera, or a combination thereof. The imaging system may comprise a 2D camera and a depth sensor. The imaging system may be configured for acquiring topographic images.

The possibility that the animal may be walking while acquiring an image allow for a frequent monitoring of the weight of the animal, as this can happen without interfering with the daily life of the animals. This frequent monitoring of the weight of the animal, further allows the farmer to gather data for statistics on the weight of an animal. This data can be used in mathematical modelling of the weight of the animal in order to differentiate the weight contribution into short-term fluctuations and long-term changes. The short-term fluctuations may be due to inflation and/or feed content of the animal and/or oedema in the animal. Long-term changes however reflect the actual weight changes of the body of the animal such as changes in muscle and fat amount and/or distribution and/or the growth of the skeleton in the case of a not fully grown animal, and/or the growth of a foetus in the case of a pregnant animal and/or the event of giving birth in the case of a pregnant animal.

The short term weight development of an animal, such as changes during the day, is related to the duration since the last feeding and/or milking. Hence, in a preferred embodiment the time of these events are logged. In this manner it will be possible make a model of time-dependent short-term fluctuations of the weight of the animal. In that regard it is noted that daily fluctuations in an animal's weight can be an indicator for animal health, e.g. large daily fluctuations can be an indicator of a health problem.

DESCRIPTION OF THE DRAWINGS

The invention will in the following be described in greater detail with reference to the drawings. The drawings are exemplary and are intended to illustrate some of the features of the present method and system and are not to be construed as limiting to the presently disclosed invention.

FIG. 11 shows data for herd 2 and corresponds to FIG. 4, which shows the same type of data for herd 1. FIG. 11 shows all acquired data points for herd 2.

DETAILED DESCRIPTION OF THE INVENTION

The normal meaning of the term "topography" is that it is the study and description of the physical features or shape of an area, for example its hills, valleys, or rivers, or the representation of these features on maps, i.e. usually used with geography. In this case the topography of the back of the animal is therefore understood as the shape of the back of the animal, i.e. the 3D shape with whatever "hills" and "vallyes" that appear on of back of the animal.

The term "topology" as used herein is the anatomy of a specific bodily area, structure, or part, in this case typically the back of the animal. An animal's anatomy is the structure of its body, e.g. the outside shape of the body.

In the preferred embodiment the extracted data used for correlation against the reference model comprises a discrete number of contour points in order to simplify the calculation. Preferably less than 50 contour points, more preferably less than 25 contour points, even more preferably less than 20 contour points, most preferably less than 15 contour points, such as 12 contour points. It has been shown that the appropriately selected, only 12 contour points extracted from a 3D image of the animal's back can be sufficient to determine the weight of the animal. I.e. between 10 and 50 contour points is sufficient to determine the weight of the animal.

The spine of the animal is preferably located in the at least one 3D image of the back of the animal. The spine of the animal may be defined as a through-going line of local height maxima as exemplified in FIG. 1. Consequently the spine of the animal can be used to define a longitudinal direction in the 3D image of the animal.

In the preferred embodiment data is extracted from the 3D image by contour plotting the back of the animal thereby generating contour lines relative to the spine. A contour line may be based on the relative drop of height relative to the spine height at a given position along the spine, i.e. a contour line connect contour points of equal elevation.

Figure 2:
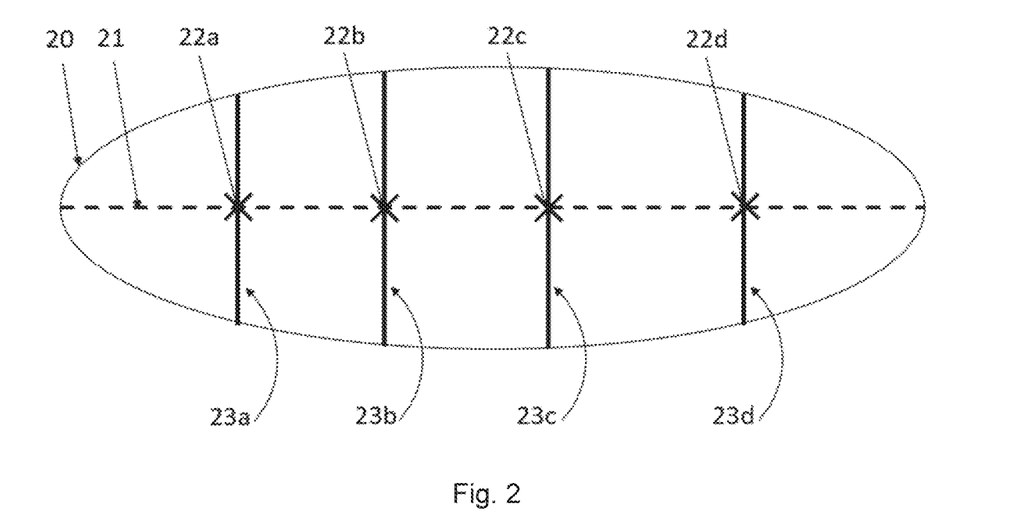
FIG. 2 is a schematic view of an embodiment of the process of generating the contour plots of the back of the animal.

Hence, a single contour point of a contour line may be defined as a predefined decrease of height on the back of the animal relative to the height of the spine, wherein the decrease of height relative to a point on the spine of the animal is found along a line perpendicular to the spine, as exemplary illustrated in FIG. 2.

As stated above the inventors have realized that the weight of the animal can be predicted with only a very limited number of data points extracted from the 3D image. In one embodiment the extracted data comprises less than 20 contour points, such as less than 10 contour points, such as between 1 and 10 contour points, such as less than 7, 6 or 5 contour points, such as 4 contour points, selected from the spine, and/or less than 20 contour points, such as less than 10 contour points, such as less than 7, 6 or 5 contour points, such as between 1 and 10 contour points, such as 4 contour points, selected from each of less than 10 contour lines, such as less than 7, 6 or 5 contour lines, such as between 1 and 10 contour lines, such as 3 contour lines, relative to the spine. The contour lines are preferably generated at discrete intervals at a height less than or equal to 15 cm, preferably less than or equal to 10 cm, relative to the height of the spine. For example contour lines at 2.5 cm, 5 cm and 10 cm relative to the spine.

Identification of the animal is not necessary in order to determine the weight, only the breed of the animal must typically be known. However, it is an advantage for the further data analysis and monitoring of the individual animal to know the identity of the specific imaged animal. Identification may be manual, for example by reading the identification number of the ear tags of the animal, or electronic identification means such as radio frequency ID (RFID), by pattern recognition of the animal, by a known, orders sequence of the animals or any other mean of identification. The animal may be identified prior to the image acquisition or after the image acquisition.

As shown in WO 2017/001538 it is possible to (uniquely) identify animals in a population of known animals based on images of the animal's back. Hence, the presently disclosed approach may further comprise the step of identifying the animal based on said at least one 3D image.

The realization that determination of animal weight is possible based on 3D imaging of the animal's back makes it possible to acquire one or more images while the animal is moving. Hence, in one embodiment of the present disclosure the animal is moving during acquisition of said at least one 3D image. More than one 3D image may be acquired of the animal. Hence, said at least one 3D image is preferably based on a plurality of 3D images, and these may be acquired while the animal is moving. Consequently, the data analysis may be based on a median image of two or more images.

Figure 1:
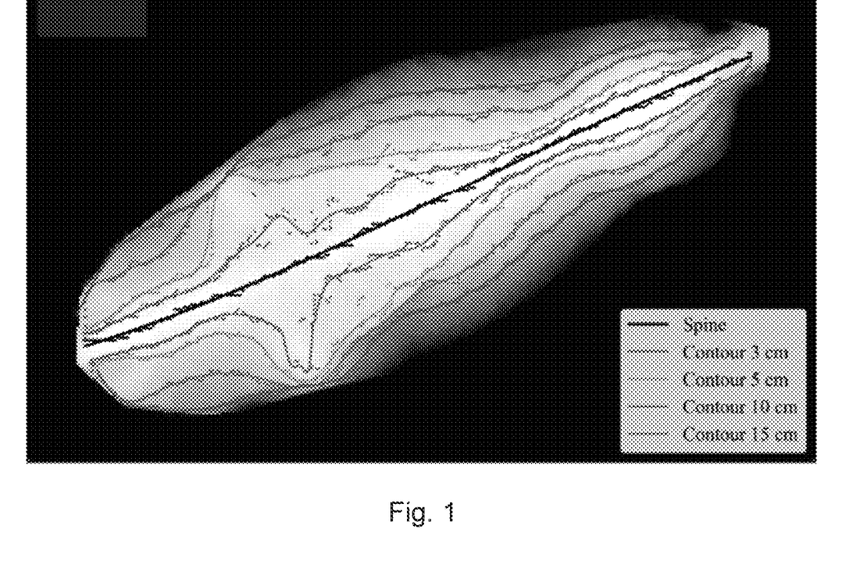
FIG. 1 illustrates the contour lines of the back of an animal corresponding to height drops relative to the spine level.

An example of contour plotting is illustrated in FIG. 1 in which each line indicates a contour plot of the back of a cow. The middle longitudinal line is formed by local maxima of the height in the image and defines the spine of the animal. In one embodiment contour plotting are lines and/or points along the back of the animal all corresponding to a specific amount of height drop relative to the spine in that particular area. Preferably the outer contours of the animal, reflecting the perimeter of the animal, meaning the physical extent of the animal such as how broad the back of the animal is, is not included in the weight calculations. Hence, in the preferred embodiment the weight is based exclusively on the topology and/or topography of the back, and not the perimeter and/or broadness of the animal. The weight is hence entirely based on the topography and/or topology of the back.

One possible strategy to develop such a contour plot is illustrated in FIG. 2, wherein the body of the animal is represented by an ellipse 20. The spine is found along the back of the animal as the tallest part of the central area of the back, i.e. local height maxima, when going along a central line connecting the neck to the tail. The position of the spine, the spine axis, is represented by the dashed line 21 in FIG. 2. Along the spine axis 21 a given number of points of interest is selected. In FIG. 2, four points have been selected and are denoted 22a-d and are marked with each their cross along the spine.

From a selected point of the spine, say 22a, a line is drawn perpendicular to the axis of the spine, this perpendicular axis is denoted 23a in FIG. 2. From the point of interest on the spine, 22a, the perpendicular line 23a is followed along one direction towards the edge of the animal, for example towards the right of the animal. Once a height drop of X cm relative to the height of the spine in 22a is reached, this point is noted in the database. X is referring to a real number. Next this process is repeated as one goes along 23a toward the opposite side of the animal, which could hence be the left of the animal, and the same level of height drop of X cm is noted on this opposite side of the spine. This process is repeated for all points of interest 22b-d along the spine 21 and along the respectively perpendicular lines 23b-d. Once all the points representing a given height drop of X cm relative to the points of interest 22a-d along the spine axis 21 has been located, a line is fitted to best describe the position of said points. This fitted lines now represents the contour line of the relative height drop of X cm relative to individual points along the spine. If more contour lines for different values of height drops are desired the process may be repeated for other values of relative height drop relative to the height of each point along the spine. Alternatively, all relevant contour points along a given perpendicular line may be found before moving on to the line perpendicular to the next point of interest along the spine. These relevant contour plots may for example be X cm, Y cm, Z cm and T cm, where X, Y, Z and T referring to real numbers. In FIG. 1 for example, the values of X, Y, Z and T are 3, 5. 10 and 15 cm, respectively, each resulting in their respective contour line.

The illustration of FIG. 2 is a simplified illustration for the purpose of illustrating the described strategy to develop a contour plot in the simplest possible way. Hence, the animal is illustrated as an ellipse for simplicity of the illustration only. In other words, the animal body shape is not considered an ellipse by the strategy of developing a contour plot. In the true data handling process, as in FIG. 1, the spine is not necessarily a perfect straight line as the animal has an irregular shape and not an ellipse. Hence, the perpendicular line of a given point along the spine may be estimated based on a number of neighbouring point on the spine, to the point of interest. These points may for instance be fitted to a straight line and the perpendicular line is determined based on this fitted line. Hence, the best estimate for a perpendicular line for a given point of an irregular line is made in the case of treating true data.

Hence, the contour plots may be based on a discrete number of points and a best fit to these points. In this manner the contour plots reflects a drop in height relative to the spine in every position along the back of the animal rather than the contour plots with a fixed, same reference for all point of the contour plot. Hence, in this embodiment a single contour point of a contour line reflects a specific decrease of height on the back relative to the height of the spine along a line perpendicular to the spine of the animal, passing trough said contour point, so that the basis of the contour plot is not an ultimate height relative to a given fix point, but every contour point is calculated relative to each their separate point of reference along the spine of the animal. This further means that the contour plotting of the animal's back may happen along the length of the back of the animal, which in other words is along the spine of the animal. In the preferred embodiment the lines connecting the individual point of the topography of the back is made as a best fit to the points representing a given height drop, and hence the fitted lines reflects the best fit for a contour line.

In one embodiment the animal is walking during the image acquisition. The 3D image may hence be acquired while the animal is moving, for example walking in a straight line. The ability to gain weight information of a moving animal is a great advantage as it allows weight determination of a large number of animals in a row, and hence this eliminates the need for individually handling the individual animal. When animals are walking from a shed resting area to a feeding and/or milking area, or the opposite direction, the animals may be passing through a narrow aisle thereby only allowing one animal to pass at a time. By placing an imaging system above this narrow aisle the animals will walk by the area below the camera which can then capture an image of each individual animal as they are passing through the aisle. A great advantage hereto is that the animals will not be overlapping the view of each other, seen from the 3D camera from above. Hence, the animals are passing the narrow aisle and passing through the frame area of the 3D camera as they are being canalized or lead from for example a rest area to a feeding and/or milking area or the opposite direction. Another advantage of the narrow aisle is that it is possible to gain a good control the flow of animals.

Figure 3:
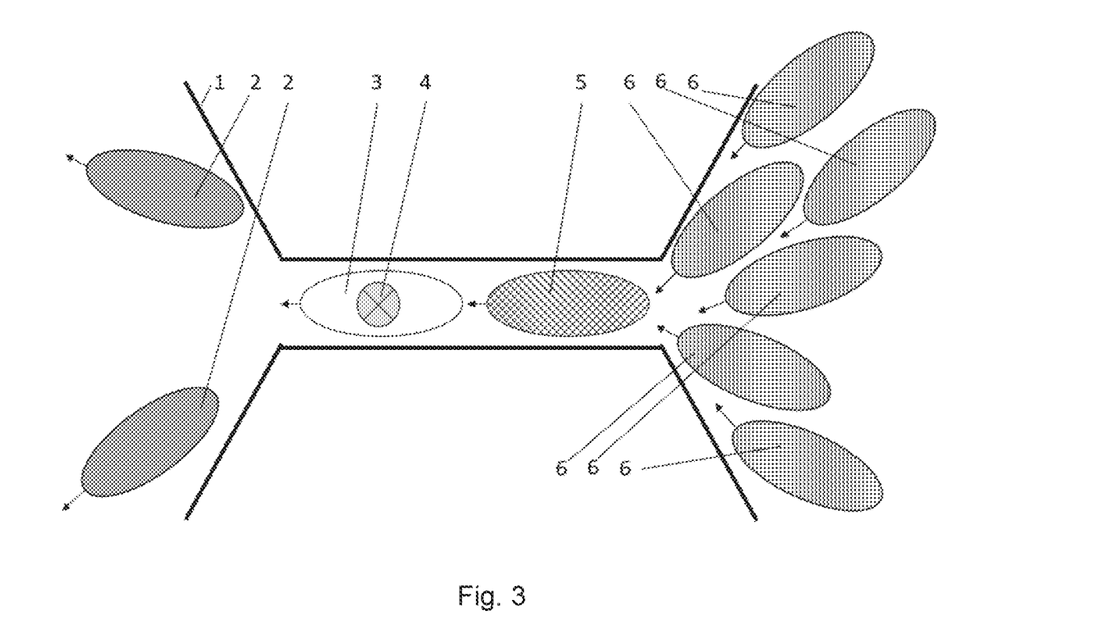
FIG. 3 is a schematic view of the canalizing guidance of animals through a lock/narrow aisle from one shed area to another.

An example of this process of leading the animal trough a narrow aisle is shown in FIG. 3. Here the thick lines 1 illustrates the boundaries of the areas of which the animals can move. The boundaries may be a hence or a wall or a similar enclosure mechanism. Each animal is, for simplicity of the figure, illustrated by an ellipse in FIG. 3. The arrow connected to each animal (ellipse in the figure) illustrates the direction of which the animal is moving. The animals 2 to the left are the animals which have already passed the narrow aisle, the animal 3 standing just below the 3D camera 4 is an animal situated within the narrow aisle and currently being imaged by the 3D camera 4. The animal behind 5 has just entered the narrow aisle and will be imaged as it soon passes through the area just below the 3D camera 4 hence, when animal 5 reaches the current position of animal 3. The animals to the right 6 all represent the animals still waiting to enter the narrow aisle to ultimately enter the area to the left of the aisle.

In an embodiment of the present disclosure, more than one image is acquired of the back of the animal. This may be multiple images of the animal while it is walking below the camera or multiple image of the animal standing still. If the animal is moving the images may be required for as long as the animal has either a part of the body inside the imaging frame of the camera. Alternatively the images may only be acquired for the period of time of which the animal has its entire body inside the imaging frame of the camera. Yet another alternative is that the camera may only acquire images for a given, pre-set period of time or the camera may require a pre-set number of images.

In the preferred embodiment the data analysis is based on a median image of two or more images. Hence, all or some of the acquired images should be combined to generate an average of the shape of the back of the animal. The term "median image" refers to the average image, generated as an average of the information of the topography and/or anatomy of the back of the animal in all collected images. One advantage of using such a median image is that the movement of the back of an animal which is walking during image acquisition, can be smoothed out in the median or average image so that the walking induced variations in the topography can be eliminated.

One of the great advantages of using imaging rather than having the animal walking over a weight scale is that the animals walking over a weight scale may only have some, and not all feet on the scale when the weight is recorded. In addition, in such a setup, the animals will typically be walking very closely together, and it is possible that more than one animal would be partially or fully standing on the weight scale at the same time making the weight scale readout wrong when trying to establish the weight of individual animals.

In an embodiment, the animal is standing still during the acquirement of data. Preferably, the method will be compatible with both moving animals and animals which are standing still. Preferably, the imaging system is configured to acquire the image while the animal is walking. In an embodiment, the imaging system is configured to acquire the image while the animal is standing still. Most preferably, the imaging system is capable of obtaining data for a reliable weight calculation regardless of the animal is moving or not.

Surprisingly, the topography and/or topology of the back of the animal turns out to be so strongly related to the weight of the animal that other, apparently essential features, such as the height of the animal's stomach above the floor or the width of the animals hips and/or shoulders, are unnecessary parameters for the purpose of estimating the weight of the animal using the presently disclosed system and/or method. Hence, the present inventors has unexpectedly realized that the shape of the back of the animal is sufficient to determine the weight of the animal with a high precision.

In the preferred embodiment the acquisition of the at least one image of the back of the animal is carried out at least once, preferably multiple times, per day to capture time- and condition-specific variation in the weight. Condition-specific variations may refer to weight developments which are dependent on whether the animal for example:
has just eaten,
has just been milked
has recently given birth,
is pregnant,
is not fully grown
along with other parameters which influence the weight of the animal and which are subject to change over a given timescale which can either be long or short. Time-specific variations may for instance be the weight in the morning versus the weight in the evening. The variation hence arise since in the morning it has been a long time since the animal has eaten whereas in the evening the animal has accumulated the content of its digestive system during the whole day or at least a part of the day.

Preferably, all acquired data is saved in a database. The data can then be accessed at later times and it is furthermore possible to plot a time dependent plot of the weight development, which may help in the process of finding animals which are not well. The method may hence be combined with methods for pattern recognition and/or machine learning, to make early state diagnostics of animals that show an alarming weight development. In an embodiment, the process of monitoring and modelling the weight changes of the animal is based on a large number of measurements acquired over an extended period such as multiple days, preferably multiple weeks and more preferably multiple months. Preferably, these data also contains multiple data points per day for each day over the acquisition time and in the preferred embodiment, this data is supported by the time schedule of the feeding and/or milking event of the animal. As the process of inflation as well as the feed intake is strongly dependent on the time since the last feeding, this data strongly supports the modelling of short-term fluctuations if the weight data is accompanied by data regarding the amount of time since the last feeding and/or milking.

In a preferred embodiment of the present disclosure, the time of the latest feeding/milking events is stored along with the acquired data relating to the weight of the animal. This information may be included into the weight calculation algorithm.

When evaluating the weight development it may be of interest to evaluate short term variations and long term variations separately. Preferably, the data history is used to generate a model to divide the calculated weight measurement into contributions of at least long-term variations and short-term fluctuations. More preferably, the calculated weight measurements are used to mathematically model short-term fluctuations and long-term variations in the weight determination. Hence the model may subdivide variations in the weight measurements into short-term fluctuations and long term changes. In an embodiment of the present disclosure the short-term fluctuations in the weight measurement are changes during the day or on a day-to-day basis. These short-term fluctuations in the weight determination may be ascribed to inflation and/or feed content of the intestinal system and/or oedema of the animal. The long-term changes in the weight determination may be considered gradual changes over a period of at least several days, preferably over several weeks, more preferably over several months. These long-term changes in the weight of the animal may be ascribed to growth/degradation of the body of the non-pregnant animal whereas long-term changes may be ascribed to growth/degradation of the body, muscles, fat and/or skeleton.

In general the presently disclosed approach can determine the weight of the animal independent of the age of the animal, number of lactations and whether the animal is pregnant or sick. E.g. in terms of pregnancy there will be a considerable weight increase over a period of time, but as the weight increase due to the pregnancy will result in an increase of the topography/topology of the back, the weight increase will be detected by the presently disclosed approach. Hence, the presently disclosed approach can be used to detect a pregnancy and/or monitor a pregnancy during the pregnancy period.

In a further embodiment pregnancy is included in the weight determination model. I.e. once it is known that a specific animal is pregnant it may be accounted for in a model, i.e. to improve the precision of the weight determination in order to more closely monitor a pregnant animal. Hence, the pregnancy may be compensated and/or incorporated and/or otherwise included in the weight modelling so that the process of growing a foetus is not confused with weight gain of the animal itself and so that the influence of the pregnancy on the contour of the animal's back can be properly included in the model. In a further embodiment the long-term changes of the pregnant animal are ascribed to growth/degradation of the body and growth of a foetus of the pregnant animal. Preferably, the pregnancy is included in the algorithm determining the body weight of the animal based on the acquired data from the optical sensor. A possible pregnancy of an animal may be registered manually in the system for that particular animal. Over the period of the pregnancy, the weight development of the animal may be logged with that reservation that the animal is growing a foetus. Also, the pregnancy may change the parameters of the algorithm calculating the weight, so that the calculated weight is a better fit for the pregnant animal.

The event of giving birth may be registered into the data and compensated in the mathematical model or otherwise noted in the database in order to not confuse this event with a sudden, drastic body degradation of the farm animal. Furthermore the weight loss ascribed to an event of giving birth is, in an embodiment of the present disclosure, used to estimate the fraction of weight gain during the pregnancy, which can be ascribed to the growth of a foetus. Hence, this contribution to the weight gain can be retrospectively introduced to the mathematical model. Accordingly, in an embodiment of the present invention an event of giving birth is registered into the data and included in the mathematical model to ensure a proper calculation of the current weight of the animal and possibly for other purposes as well. One approach for registering the event of the birth is that once the animal has given birth the event of the birth is logged into the processing unit. The logging may happen manually or automatically. The weight drop following the event of given birth may further be used to calculate the amount of the weight gain of the animal, over the duration of the pregnancy, was due to the weight gain related to the pregnancy. Weight gain related to pregnancy may be elements such as the growth of one or more fetuses and one or more placentas, increased blood volume and additional fat depots among other parameters. The presently disclosed approach mat then compare the weight before and during the pregnancy with the weight after giving birth.

The imaging system typically includes at least optical device, e.g. a camera, and in order to keep the at least one optical device clean the device may have to eventually be cleaned and/or possibly protected from the dirt of the shed environment. One possible solution is to use a protective cover keeping the dirt away from the actual optical device. In the preferred embodiment the at least one optical device is protected by a protective cover to prevent dirt from covering the functioning parts of the optical device, directly. In a further embodiment the cover of the at least one optical detector is cleaned using an automatized cleaning system such as an automatic windscreen wiper. Hence, if the optical device cover is getting too dirty for capturing the desired data the cover can get cleaned automatically by running the cleaning system such as an automatic windscreen wiper.

Another approach to keep the at least one optical detector clean is for example by having the at least one optical detector protected by a gate or a shutter only opening for a short period of time upon acquiring the data. Hence the detector will only be exposed for a very short amount of time upon data collection by the at least one optical detector. Thus, in one embodiment the at least one optical detector is protected by a gate or a shutter only opening for a short period of time upon acquiring the data. Hence, the gate or shutter will open briefly for image acquisition, and will then close again to avoid the optical device getting dirty. In the latter case the optical device will contain both a protective cover and a gate/shutter, the gate/shutter hence preventing the cover of the optical device to get dirty too quickly. To optimize the time of which the optical detector is exposed to collect data, hence to optimize the time of the shutter to open the shutter or gate of the system may include another feedback system, to determine when an animal is standing in a proper position for data acquisition. This feedback system may be an independent system based on a sensor placed next to the 3D camera. The position of the animals may be determined from another detector and/or sensor not covered by a shutter or a gate and this determines when an animal is in a proper position for imaging. When this happens the shutter will open and the range images will be taken after which the shutter closes immediately. It may also be possible to acquire a series of images before the shutter closes.

In a further embodiment the at least one optical detector includes a cleaning alert system sensing when the sensor needs to get cleaned and notify the user through said alert system such as a light turning on, a noise playing or a wireless signal transmitted to a computer. This is particularly useful if the device does not have an automatized cleaning system or if it is insufficient to fully clean the device. In this case the alert system will make the user aware that further cleaning of the device or the cover of the device is needed. The user might then manually clean the device or activate an automatized cleaning system. The cleaning process may then be automatic or manual. If the automate cleaning process is sufficient it may not be necessary to notify the user and this step might be left out as long as the system can efficiently self-clean.

As used herein the animal may be a bovine subject, preferably including both cows and bulls, whether adult or newborn animals. Consequently the breed of the animals may be selected from the group of: The Jersey breed, the Holstein breed, the Holstein-Friesian cattle population. Holstein Swartbont cattle population, the Deutsche Holstein Schwarzbunt cattle population, the US Holstein cattle population, the Red and White Holstein breed, the Deutsche Holstein Schwarzbunt cattle population, the Danish Red population, the Finnish Ayrshire population, the Swedish Red and White population, the Danish Holstein population, the Swedish Red and White population and the Nordic Red population.

EXAMPLES

Example 1

In order to generate a reference of the cattle of the Jersey breed, the back of the individual animals of a herd of 102 Jersey cattle were imaged during four weeks using the system and method of the present disclosure. The animals of the herd had an average weight of 460 kg and had a weight range from 350 to 650 kg. During a period of 4 weeks, 1329 measurements of the backs of the animals of the herd were carried out, the number of measurements per animal varied between 3 and 15 measurements during the 4 weeks. Among the 1329 measurements 1149 of them were carried out in the morning and 180 was carried out in the afternoon at any day during the 4 weeks period. The images were acquired at the same time (within same minute) as a measurement of the animal weight was acquired using a weight scale. After generation of the reference model it was therefore possible to test and cross-validate the presently disclosed approach.

Three contour lines were generated on each side of the spine, located by the contour plotting method as disclosed herein. The three contour lines related to a decrease of 2.5 cm, 5 cm and 10 cm relative to the spine, using the approach of each point representing the same relative decrease in height relative to the spine, have each their point of reference along the spine as described above. In this example 100 points along the spine were detected and 100 points were registered for each of the height drops found relative to the spine. Hence 300 points on each side of the spine were used for estimating the contour plots used to generate the reference model.

The model used in this example is a Partial least square (PLS) model. The 400 contour variables from the back of the cow are analysed in a partial least square model. This is due to the auto-correlation between the variables. Using all 400 variables in the model would be an over fitted model and the majority of the variables would not contribute with extra information to the model. A prediction model can be generated with the number of predictors equal to explaining more than 98% of the variation in weight. The prediction of weight is estimated using the number of variables suggested by the model. The residuals are defined as the difference between the predicted and the observed variables for each individual weight phenotype. For all phenotypes both a registration for weight as well as a contour description of the back of the cow is available.

In examples 1 and 2 mentioned herein it turned out that only 12 contour points selected from the spine and the three contour lines were sufficient to predict the weight with adequate precision. In the specific case four points selected along the spine, three contour points from the contour line at 2.5 cm, one contour point from the 5 cm contour line and four points from the 10 cm contour line. The spine was generated with 100 contour points in total and each of the three contour lines were generated with 100 contour points each. The predictor points were the following: $C0\_5, C0\_32, C0\_64$ and $C0\_90$ from the spine, $C1\_24, C1\_54$ and $C1\_85$ from the 2.5 cm contour line, $C2\_48$ from the 5 cm contour line and C3_11, C3_40, C3_72 and C3_98 from the 10 cm contour line. As seen from the predictor points they are distributed along the contour lines to cover more area of the back of the animal.

Similar results can be obtained with other contour points, but the principle is that only a limited number of contour points selected from a limited number of contour lines (including the spine) are sufficient to adequately describe the 3D shape of the animal in order to determine the weight.

Figure 4:
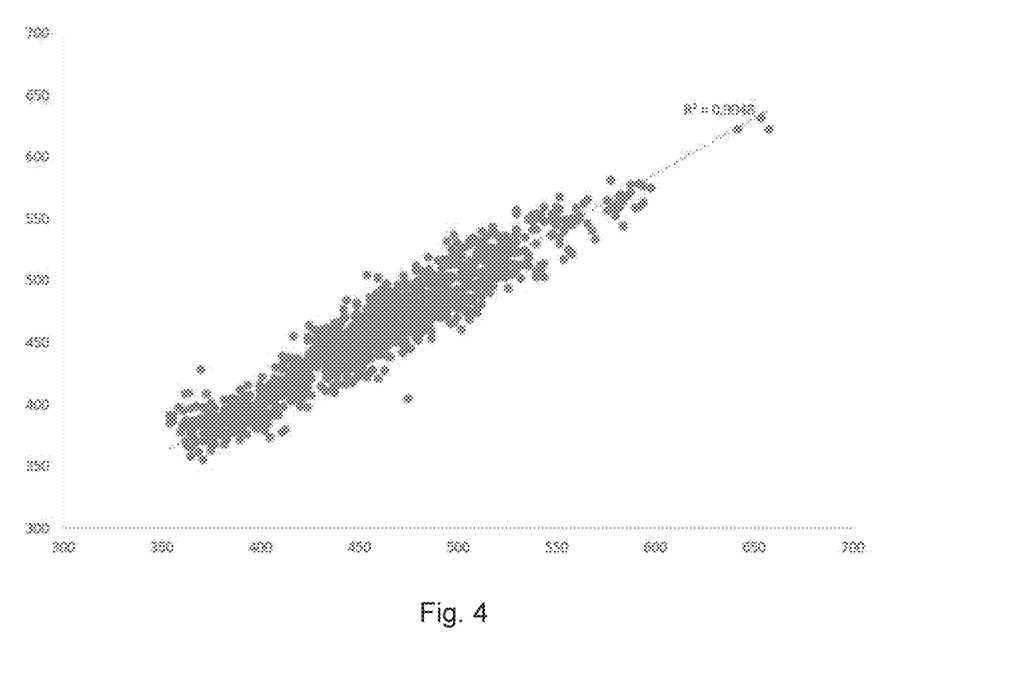
FIG. 4 illustrates proof of concept of the presently disclosed approach. The X-axis shows actual weight of the animals (in kg) measured by a physical weight scale. The Y-axis shows weight (in kg) determined based on contour points extracted from 3D images of the animals.

FIG. 4 shows all 1329 acquired data points of the present example. Hence each data point reflects a measured weight on a weight scale of one animal at one instance and the corresponding calculated weight of the same animal based on the presently disclosed approach. The data is plotted as the calculated weight as a function of the weight measured on the weight scale. Generally the data reflects a perfect agreement between the calculated weight and the measured weight of the animal demonstrating the reliability of the presently disclosed approach, even when other relevant parameters, such as age, duration since calving, or number of offspring's had by the animal, have not been included in the determination of the weight. Hence, in this example the calculations are based purely on 12 contour point predictors extracted from images of the back of the animals, and nothing else.

Figure 5:
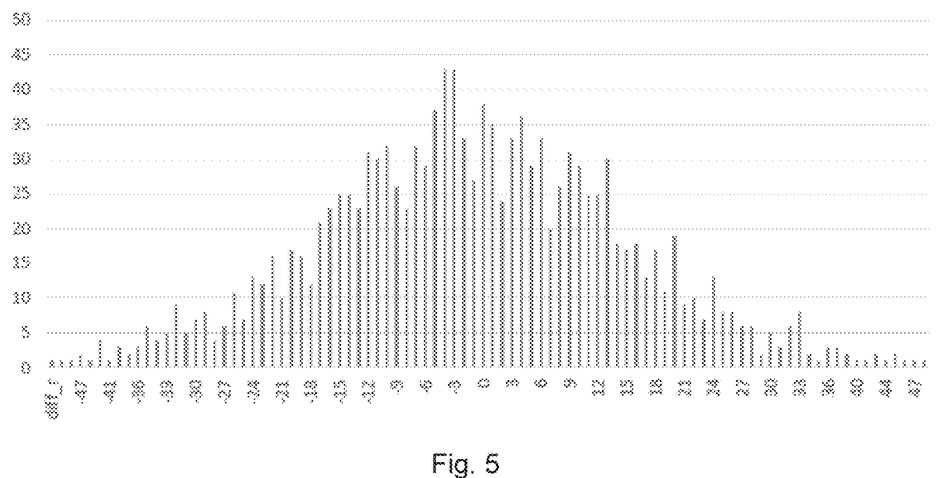
FIG. 5 shows a distribution of the deviations between calculated weight and measured weight (in kg). The Y-axis is number of observations.
Figure 6:
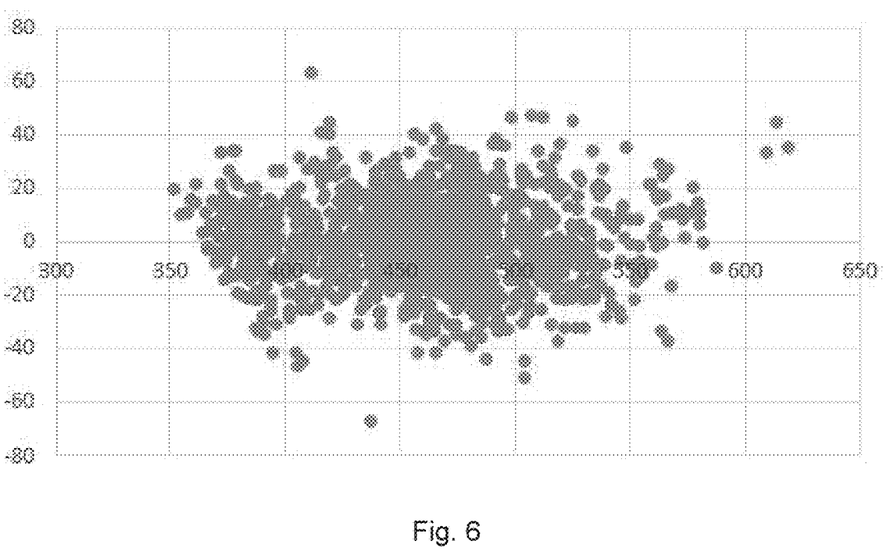
FIG. 6 shows the residuals (Y-axis, in kg) of calculated weight relative to measured weight (X-axis).

Considering the deviation of the calculated weight from the measured weight, the still relatively sparse dataset reflects a relatively symmetric normal distribution deviation between the calculated and measured dataset. This is illustrated in FIG. 5. The almost perfectly symmetric distribution of deviation around 0 demonstrates that there is no systematic error related to the data analysis. The same information can be subtracted from FIG. 6 in which the residuals are plotted as a function of the measured weight. Generally, it is seen that the distribution is relatively symmetric around a residual of 0, and there is no strong trend indicating that the residuals as systematically wrong for a given weight subgroup of animals.

Figure 7:
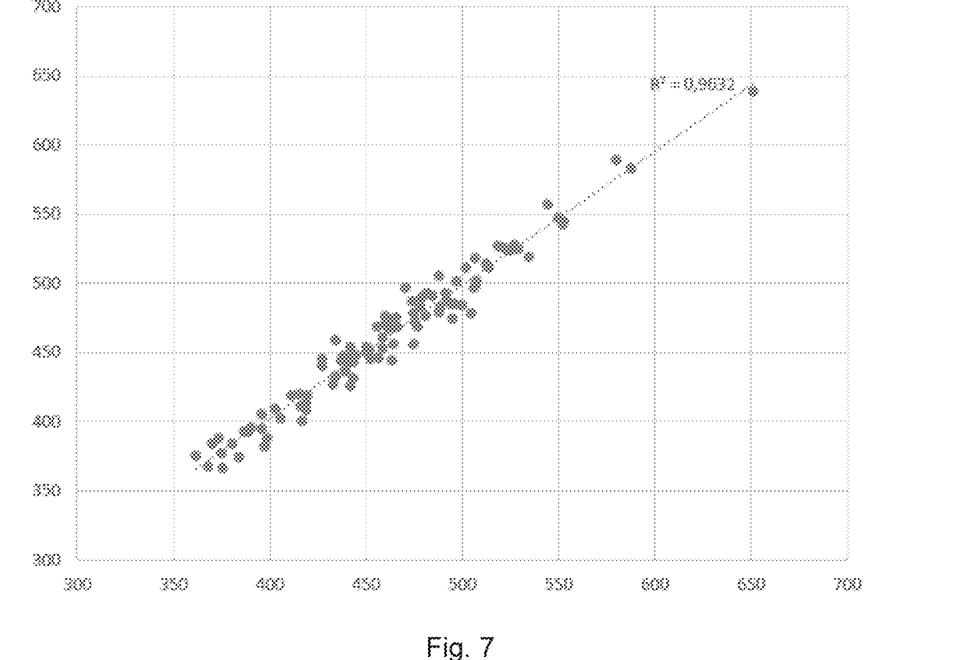
FIG. 7 shows average measurements for an animal during a four week period with the measured weigh on the X-axis and the calculated weight on the Y-axis.
Figure 8:
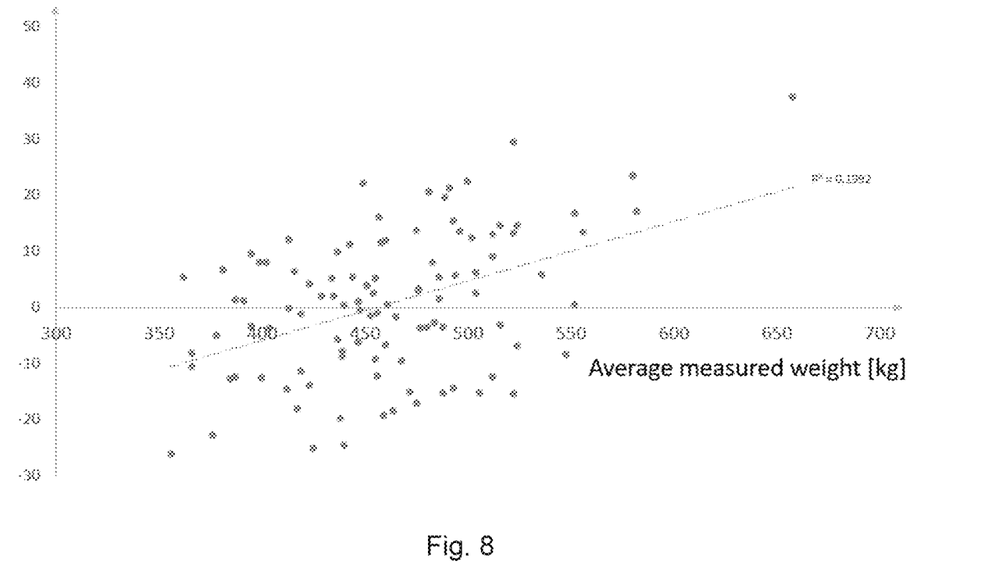
FIG. 8 relates to FIG. 7 and shows the difference (Y-axis, in kg) between the average measured (X-axis) and the average calculated weight.

By taking the average calculated weight and the average measured weight of each animal of all measurements carried out on said animal during the 4 weeks period of time (each animal having between 3 and 15 pairs of measurements and calculations), we arrive at the data presented in FIG. 7. As seen the agreement between the measured and calculated weight of each animal becomes better, which is also expected given that each point now reflects a greater amount of data. Each point (102 points) of FIG. 7 hence reflect the average weight (calculated and measured) of one individual animal in the herd. FIG. 8 reflects the difference between the average measured weight and the average calculated weight as a function of the average measured weight. This figure shows no weight dependent bias on the deviation between measured and calculated weight.

Figure 9:
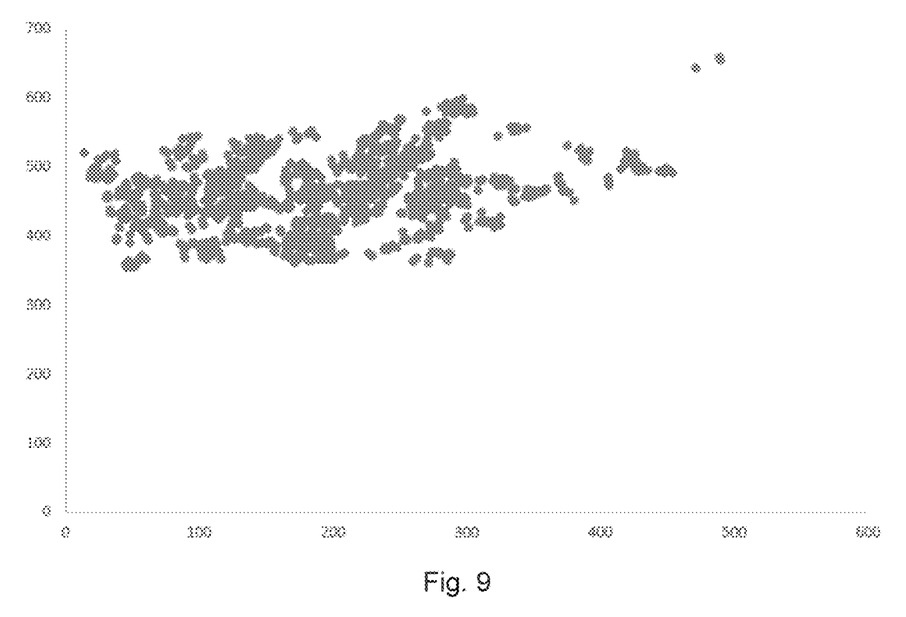
FIG. 9 shows the relation between number of days since calving (X-axis) and the weight of the animals (Y-axis, in kg).
Figure 10:
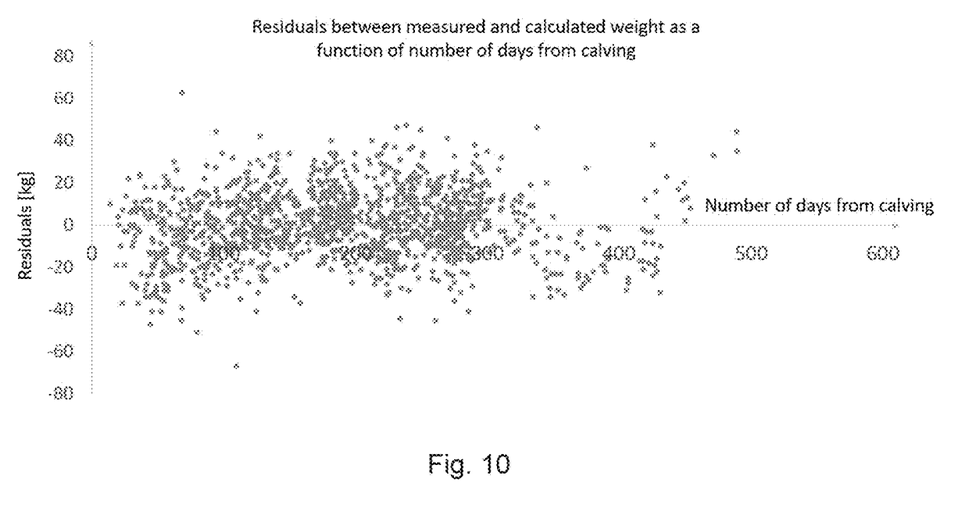
FIG. 10 relates to FIG. 9 and shows the residuals (Y-axis, in kg) between measured and calculated weight as a function of days since calving (x-axis).

It is known that the animal will lose weight in the days after given birth as the animal needs all its resources, included the extra fat depot accrued during the pregnancy, to generate milk. It will hence slowly break down the depots of its' body. After about 50 days, the animal will start to gain weight as the milk production decreases, and the animal is now able to eat enough to actually re-build its fat depots. Hence the animal will gain weight again. Also, after a sufficient long period of time the animal will get pregnant again and start gaining weight. Hence as a sanity check of the current model of this example the 1329 measurements and calculations of weight has been plotted as a function of number of days since the specific animal last was calving. The data is illustrated in FIG. 9 and shows a slow increase in the body weight of the animal as a function of number of days since calving. Notice that the data of FIG. 9 is reflecting the weight of the animals taken in this 4 weeks period of time, and hence no single animal has been followed for a period of time sufficiently long to map out a meaningful weight development of their individual weight development as a function of the number of days since calving. The residuals of the weight calculations and measurements as a function of the number of days since calving is illustrated in FIG. 10, and once again no clear systematic error appears from the weight data, also not as a function of number of days since calving. The model hence appears to be stable against bias as a function of weight and number of days since calving based on the acquired data of this example.

Example 2

In order to test whether data were applicable across different herds, the same approach as explained above in example 1 was repeated for a different herd of Jersey cattle at another farm. The second herd included 162 cattle of the Jersey breed with an average weight of 519 kg, i.e. on average the cows in herd 2 were approx. 60 kg heavier.

Figure 11:
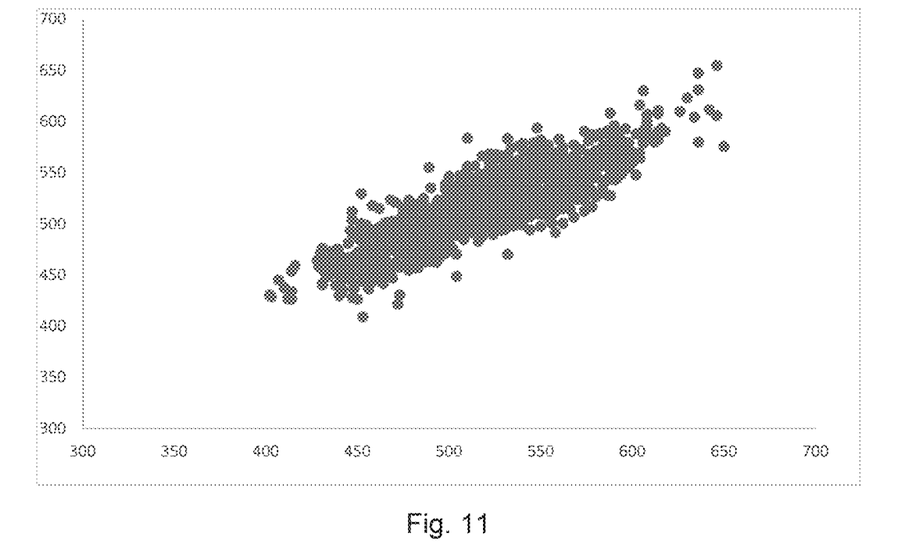

FIG. 11 shows data for herd 2 and corresponds to FIG. 4, which shows the same type of data for herd 1. FIG. 11 shows all acquired data points for herd 2. Hence each data point reflects a measured weight on a weight scale of one animal at one instance and the corresponding calculated weight of the same animal based on the presently disclosed approach. The data is plotted as the calculated weight as a function of the weight measured on the weight scale. Generally the data reflects a perfect agreement between the calculated weight and the measured weight of the animal demonstrating the reliability of the presently disclosed approach. Also in this example the calculations are based purely on 12 contour point predictors extracted from images of the back of the animals in herd 2, and nothing else.

Figure 12:
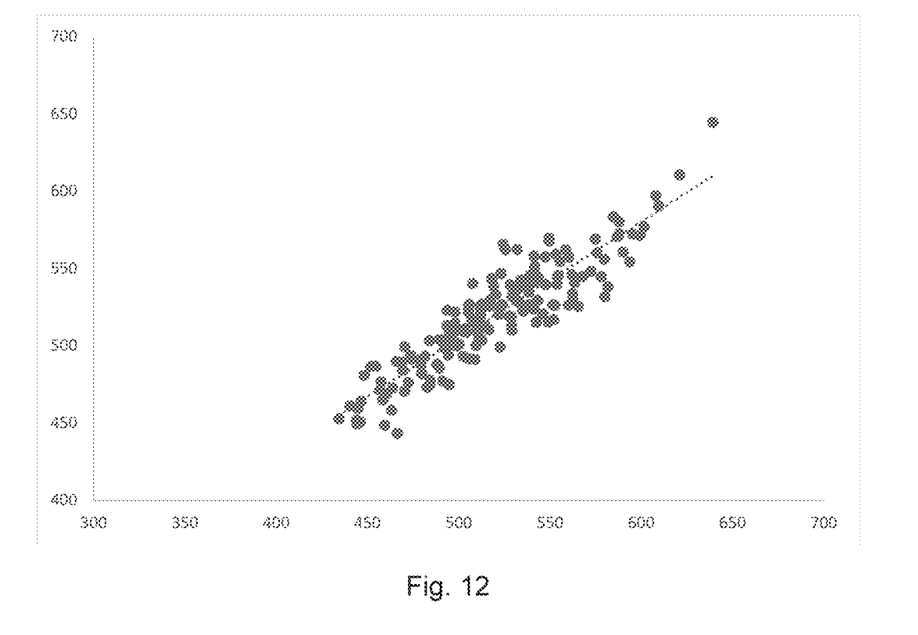
FIG. 12 shows data for herd 2 and corresponds to FIG. 7, which shows the same type of data for herd 1.

FIG. 12 shows data for herd 2 and corresponds to FIG. 7, which shows the same type of data for herd 1. As seen in FIG. 12 the agreement between the measured and calculated weight of each animal becomes better, which is also expected given that each point now reflects a greater amount of data.

The table 1 below summarizes the data for herd 1 and herd 2.

TABLE 1

| | Herd 1 | Herd 2 |
|---|---|---|
| Cows | 102 | 162 |
| Average weight | 460 | 519 |
| STD on observed weight between cows | 40 | 28 |
| STD on predicted weight between cows | 36 | 25 |
| STD on observed weight within cows | 5.9 | 7.0 |
| STD on predicted weight within cows | 5.4 | 6.4 |

As seen from the table above the STD between cows were larger in herd 1 where the cows were smallest on average.

A PLS model was used to predict weight based on 400 contours on the back of the cows from both herds. The $r^2$ between predicted and observed weight was 0.90 and a cross validation study where the cows were randomly assigned to five different groups across lactation and herd showed a model reliability of 0.82 as well as a RMSE of 0.54.

The results are independent of days in milk and lactation number but only based on the information available in the images.

Example 3

Figure 13:
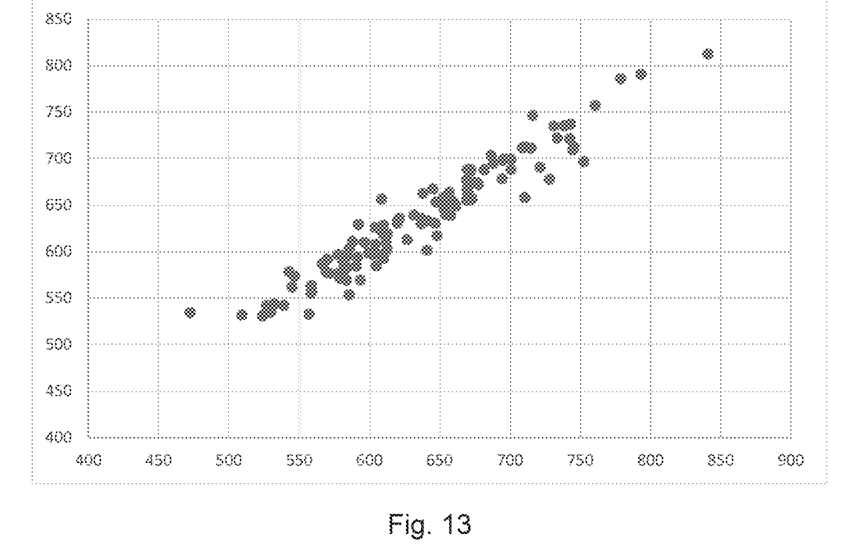
FIG. 13 shows the mean observed weight plotted against the predicted weight for one herd of Red Dairy cattle.
Figure 14:
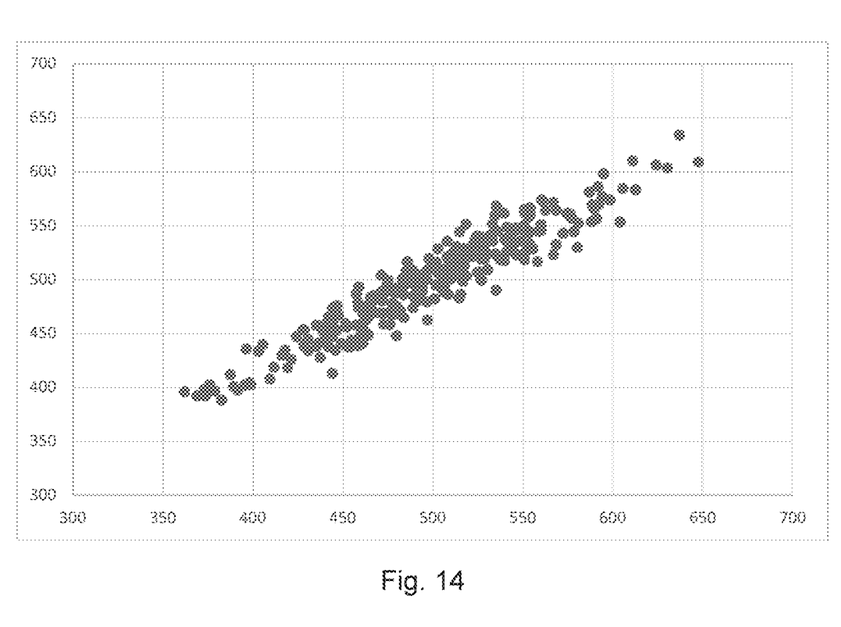
FIG. 14 shows the mean observed weight plotted against the predicted weight for two herds of Jersey cattle.
Figure 15:
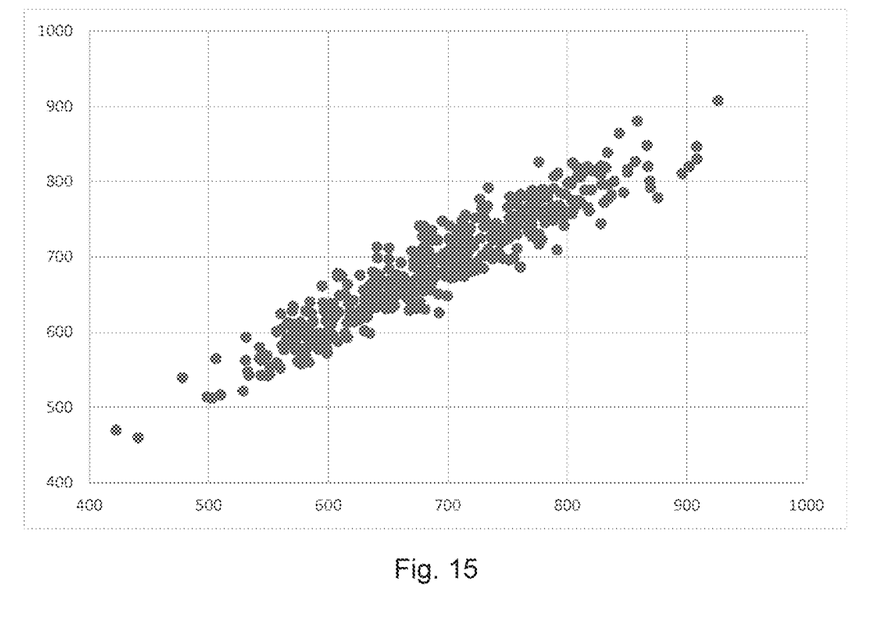
FIG. 15 shows the mean observed weight plotted against the predicted weight for one herd of Holstein cattle.

In order to test whether data were applicable across different cattle races, the same approach as explained above in examples 1 and 2 was repeated for different herds of Jersey, Holstein and Red Dairy Cattle, respectively. Weight data was recorded for four herds (two herds of Jersey cattle, one herd or Red Dairy Cattle and one herd of Holstein cattle) over a period of six weeks. The sizes of the herds were not equal resulting in an uneven distribution of data between herds, but that had no influence on the results. Using the approach as disclosed herein with less than five contour points selected from the spine, and less than five contour points, selected from each of less than five contour lines relative to the spine, the weight has been predicted by means of 3D imaging of the back of the animals, data shows that, on average, there is very little difference between the observed and the predicted weight. In a 10-fold cross-validation the Root mean square error (RSME) was estimated and data are presented in Table 2 below and in FIGS. 13-15, showing the mean observed weight plotted against the predicted weight for Red Dairy Cattle (FIG. 13), Jersey cattle (FIG. 14) and Holstein cattle (FIG. 15).

TABLE 2

| Breed | # of animals | Mean pred. weight | Mean obs. weight | STD | RMSE kg/% |
|---|---|---|---|---|---|
| RDC | 101 | 625 | 624 | 59.6 | 22.7/3.60 |
| HOL | 398 | 676 | 678 | 84.2 | 37/5.38 |
| JER | 300 | 508 | 508 | 48.8 | 23.5/4.60 |

The random animal variance, the total variance and repeatability of the obtained data is shown in Table 3 below. As seen from Table 3 the repeatability of the measurements is above 0.9, i.e. very high.

TABLE 3

| Breed | Variance Animal | Variance Residual | Repeatability | Number of animals |
|---|---|---|---|---|
| RDC | 2991 | 249 | 0.92 | 101 |
| HOL | 5566 | 553 | 0.91 | 398 |
| JER | 2073 | 164 | 0.93 | 300 |

In order to analyse whether the prediction could be further improved by including the time of the year and data relating to the individual animal's lactation number and week of lactation, the weight data was analysed using the following model.

Weight=mean+herd+week of year+lactation number+week of lactation+animal+residual The random animal variance, the total variance and the repeatability were calculated again and results are presented below in Table 4.

TABLE 4

| Breed | Variance Animal | Variance Residual | Repeatability | Number of animals |
|---|---|---|---|---|
| RDC | 2216 | 233 | 0.90 | 101 |
| HOL | 2527 | 512 | 0.83 | 398 |
| JER | 950 | 153 | 0.86 | 300 |

As seen from Table 4 the model is only slightly improved by including additional animal specific parameters, the variances decrease; the repeatability even slightly increases. It must be concluded that the approach disclosed herein based only on a discrete number of contour points, extracted from 3D imaging of the back of the animal, is sufficient to accurately predict the weight of the animal if a specific reference model is available, in particular a breed specific reference model, i.e. animal specific parameters can be left out of the weight prediction making a practical implementation feasible in a real life environment.

Further Details

1. A method for determining the weight of an animal with known breed, the method comprising the steps of
    acquiring at least one 3D image of the back of the animal
    extracting data from said at least one 3D image relating to the topology of the back of the animal, and
    calculating the weight of said animal by correlating the extracted data against a reference model comprising information of the topology of the back versus the weight for the breed of said animal.
2. The method according to item 1, wherein the extracted data comprises a discrete number of contour points, preferably less than 50 contour points, more preferably less than 25 contour points, even more preferably less than 20 contour points, most preferably less than 15 contour points, such as 12 contour points.
3. The method according to any preceding items, wherein the spine of the animal is located in the at least one 3D image of the back of the animal.
4. The method according to any preceding items, wherein the spine of the animal is defined as a through-going line of local maxima.
5. The method according to any preceding items, wherein the spine of the animal defines a longitudinal direction of the 3D image.
6. The method according to any preceding items, wherein the data is extracted from the 3D image by contour plotting the back of the animal to generate contour lines relative to the spine.
7. The method according to any preceding items 6, wherein points on a contour line are based on the relative drop of height relative to the spine height at a given position along the spine.
8. The method according to any preceding items, wherein the extracted data comprises between 1 and 10 contour points, such as 4 contour points, selected from the spine, and/or between 1 and 10 contour points, such as 4 contour points, selected from each of between 1 and 10 contour lines, such as 3 contour lines, relative to the spine.
9. The method according to any of preceding items 6-8, wherein the contour lines are generated at discrete intervals at a height less than or equal to 15 cm, preferably less than or equal to 10 cm, relative to the height of the spine.
10. The method according to any preceding items, wherein a single contour point of a contour line is defined as a predefined decrease of height on the back of the animal relative to the height of the spine, wherein the decrease of height relative to a point on the spine of the animal is found along a line perpendicular to the spine.

11. The method according to any preceding items, comprising the step of identifying the animal based on said at least one 3D image.

12. The method according to any preceding items, wherein the animal is moving during acquisition of said at least one 3D image.

13. The method according to any preceding items, wherein more than one 3D image are acquired of the animal.

14. The method according to any preceding items, wherein said at least one 3D image is based on a plurality of 3D images acquired while the animal is moving.

15. The method according to any preceding items, wherein the data analysis is based on a median image of two or more images.

16. The method according any preceding items, wherein the animal is a bovine subject, preferably including both cows and bulls, whether adult or newborn animals.

17. The method according any preceding items, wherein the breed of the animals is selected from the group of: the Jersey breed, the Holstein breed, the Holstein-Friesian cattle population, Holstein Swartbont cattle population, the Deutsche Holstein Schwarzbunt cattle population, the US Holstein cattle population, the Red and White Holstein breed, the Deutsche Holstein Schwarzbunt cattle population, the Danish Red population, the Finnish Ayrshire population, the Swedish Red and White population, the Danish Holstein population, the Swedish Red and White population and the Nordic Red population.

18. A system for determining the weight of an animal with known breed, comprising.
    an imaging system configured to acquire at least one 3D image of the back of an animal,
    a processing unit configured for
        extracting data from said at least one 3D image relating to the topology of the back of the animal, and
        calculating the weight of said animal by correlating the extracted data against a reference model comprising information of the topology of the back versus the weight for said breed of said animal.

19. The system according to item 18, configured such that said at least one 3D image is acquired from above the animal thereby imaging said animals in a top-view.

20. The system according to any of items 18 to 19, configured to acquire said at least one 3D image while the animal is standing in and/or walking through a lock.

21. The system according to any of items 18 to 20, configured to acquire said at least one 3D image when triggered by said animal approaching and/or entering a lock.

22. The system according to any of items 18 to 21, wherein the processing unit is configured to execute the method of any of items 1-17.

The invention claimed is:

1. A computer implemented method for automatically determining a weight of a bovine subject with a known breed, the method comprising:
    acquiring at least one 3D image of a back of the bovine subject from an optical device disposed in an aisle via a data connection with the optical device, wherein the optical device is positioned to capture the back of the bovine subject as the bovine subject passes through the aisle;
    extracting data in the form of a discrete number of contour points from the at least one 3D image relating to a topology of the back of the bovine subject, the contour points extracted relative to a line of local maxima along the back of the bovine subject; and
    calculating the weight of the bovine subject by directly correlating the contour points against a reference model comprising information relating to the topology of the back versus the weight for the breed of the bovine subject, the reference model further comprising non-volumetric topological characteristics specific to the breed of the bovine subject, the non-volumetric topological characteristics being associated with breed-specific weight patterns that account for localized shape variations and structural differences across bovine breeds.

2. The method according claim 1, wherein the extracted data consist of between 5 and 30 contour points.

3. The method according to claim 1, wherein the extracted data comprises less than 20 contour points.

4. The method according to claim 1, wherein the extracted data consist of between 10 and 20 contour points.

5. The method according to claim 1, wherein the data is extracted from the 3D image by contour plotting the back of the bovine subject to generate contour lines relative to the spine, which is defined as a through-going line of local maxima, and wherein contour points on a contour line are based on the relative drop of height relative to the spine height at a given position along the spine.

6. The method according to claim 5, wherein the contour lines are generated at discrete intervals at a height less than or equal to 15 cm relative to the height of the spine.

7. The method according to claim 1, wherein the extracted data comprises less than 5 contour points selected from the spine, and less than 5 contour points, selected from each of less than 5 contour lines relative to the spine.

8. The method according to claim 1, wherein the extracted data comprises between 1 and 10 contour points selected from the line of local maxima along the back of the bovine subject and between 1 and 10 contour points selected from each of between 1 and 10 contour lines relative to the line of local maxima along the back of the bovine subject.

9. The method according to claim 1, wherein a single contour point of a contour line is defined as a predefined decrease of height on the back of the bovine subject relative to the height of the spine, wherein the decrease of height relative to a point on the spine of the bovine subject is found along a line perpendicular to the spine.

10. The method according to claim 1, comprising the step of identifying the bovine subject based on the at least one 3D image.

11. The method according to claim 1, wherein the bovine subject is moving during acquisition of the at least one 3D image.

12. The method according to claim 1, wherein the at least one 3D image is based on a plurality of 3D images acquired while the bovine subject is moving.

13. The method according to claim 1, wherein the bovine subject is a bovine subject.

14. The method according to claim 1, wherein the breed of the bovine subject is selected from the group of: the Jersey breed, Friesian cattle population, Holstein Swartbont cattle population, the Deutsche Holstein Schwarzbunt cattle population, the US Holstein cattle population, the Red and White Holstein breed, the Deutsche Holstein Schwarzbunt cattle population, the Danish Red population, the Finnish Ayrshire population, the Swedish Red and White population, the Danish Holstein population, the Swedish Red and White population and the Nordic Red population.

15. The method of claim 1, wherein calculating the weight of the bovine subject is based on a median image of two or more images.

16. The method of claim 1, wherein acquiring at least one 3D image comprises acquiring a plurality of 3D images.

17. The method of claim 1, wherein the breed-specific weight patterns relate to variations in one or more of:
   surface curvature,
   width,
   skeletal outlines of the back, or
   muscular outlines of the back.

18. A system for automatically determining the weight of a bovine subject with known breed, the system comprising:
   an imaging system configured to acquire at least one 3D image of a back of an animal a bovine subject, the imaging system disposed in an aisle and positioned to capture the back of the bovine subject as the bovine subject passes through the aisle;
   a processing unit configured for:
      extracting data in the form of a discrete number of contour points from the at least one 3D image relating to the topology of the back of the bovine subject, the contour points extracted relative to a line of local maxima along the back of the bovine subject,
      calculating the weight of the bovine subject by directly correlating the contour points against a reference model comprising information relating to the topology of the back versus the weight for the breed of the bovine subject. the reference model further comprising non-volumetric topological characteristics specific to the breed of the bovine subject, the non-volumetric topological characteristics being associated with breed-specific weight patterns that account for localized shape variations and structural differences across bovine breeds, and
      transmitting data corresponding to the weight for storage to a remote location.

19. The system according to claim 18, wherein the imaging system is further configured to acquire the at least one 3D image while the bovine subject is standing in and/or walking through a lock.

20. The system according to claim 18, configured to acquire the at least one 3D image when triggered by the bovine subject approaching and/or entering a lock.

21. The system of claim 18, wherein the processing unit is further configured to acquire the at least one 3D image from above the bovine subject, imaging the bovine subject in a top-view.

\* \* \* \* \*